April 7, 1953        E. KOERBER        2,633,821
PAN GREASING APPARATUS
Filed Nov. 4, 1949        5 Sheets-Sheet 4
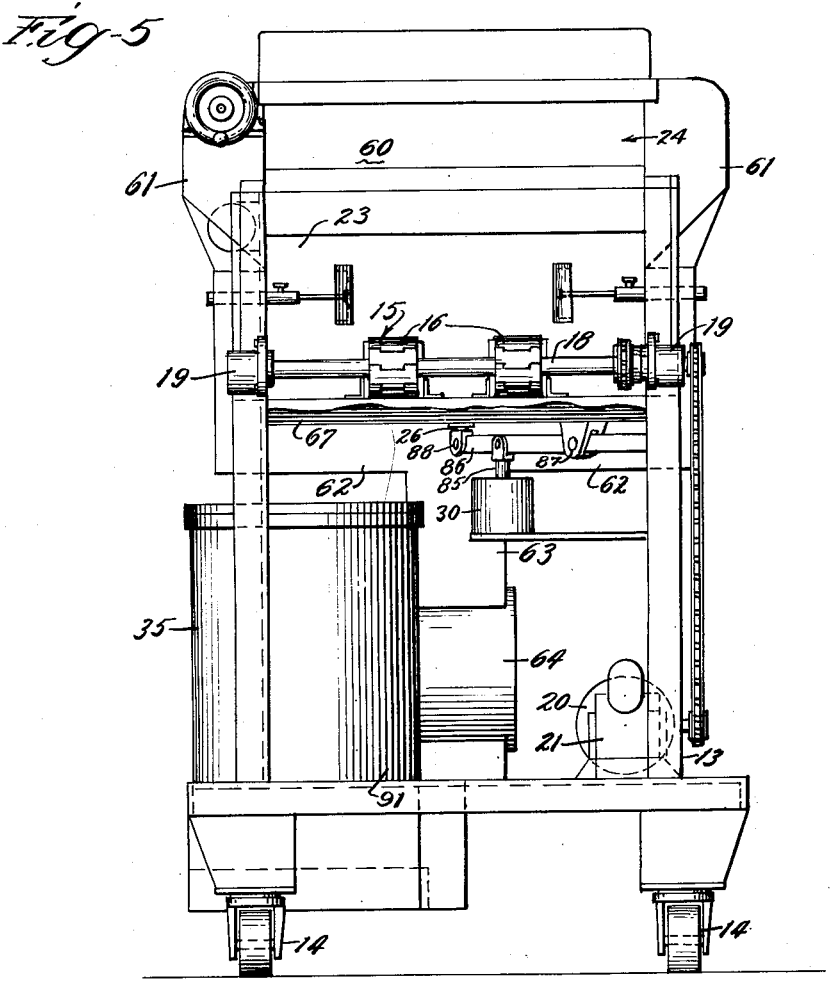
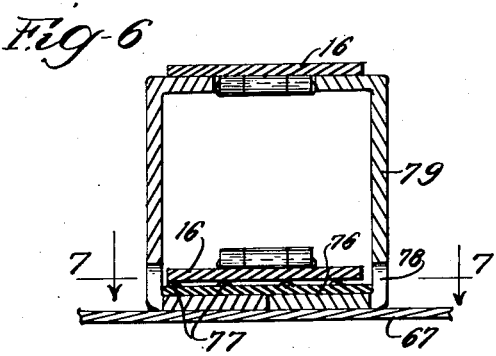
Inventor
Ernest Koerber
By: Mann and Brown
Attys

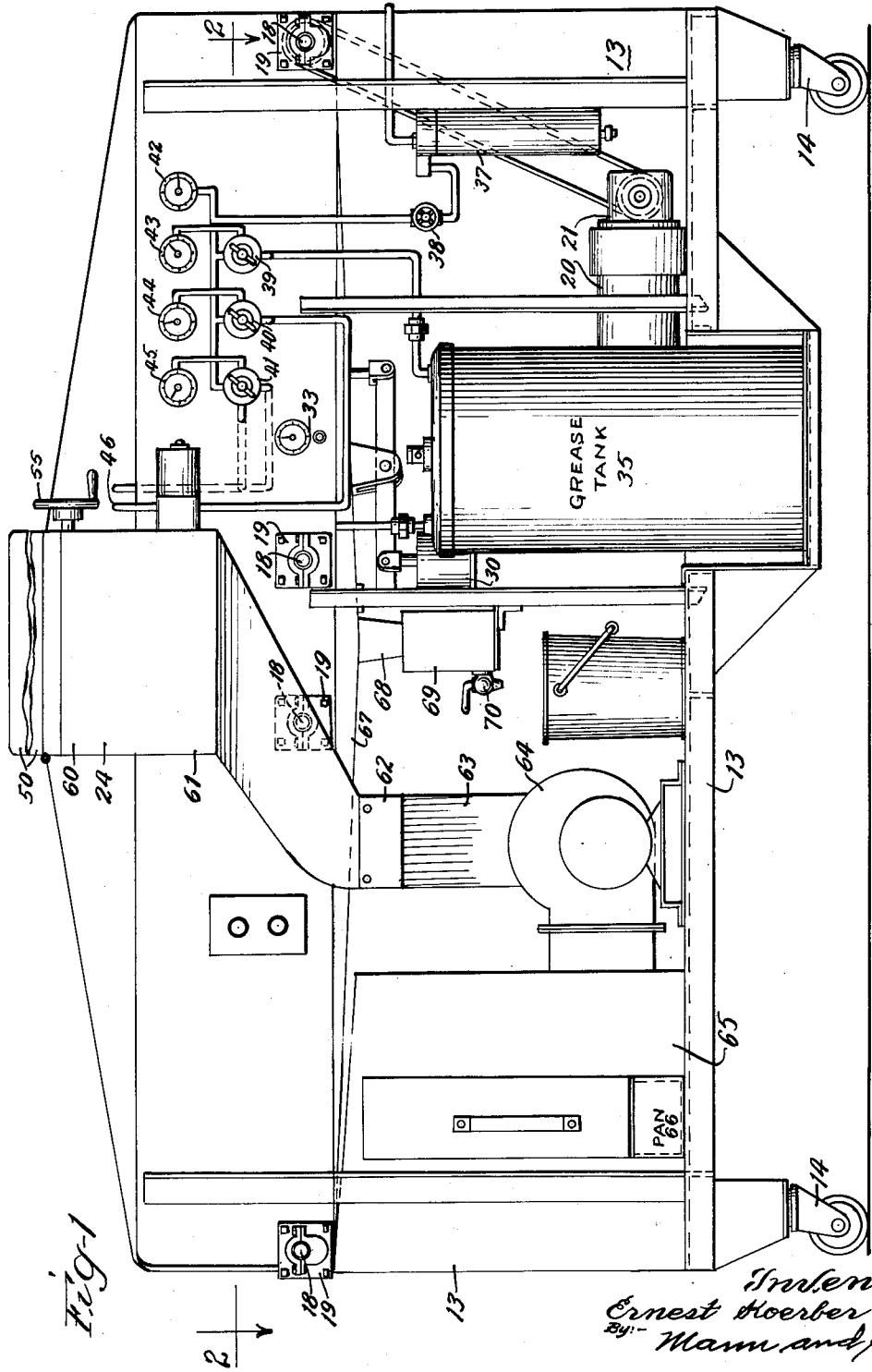

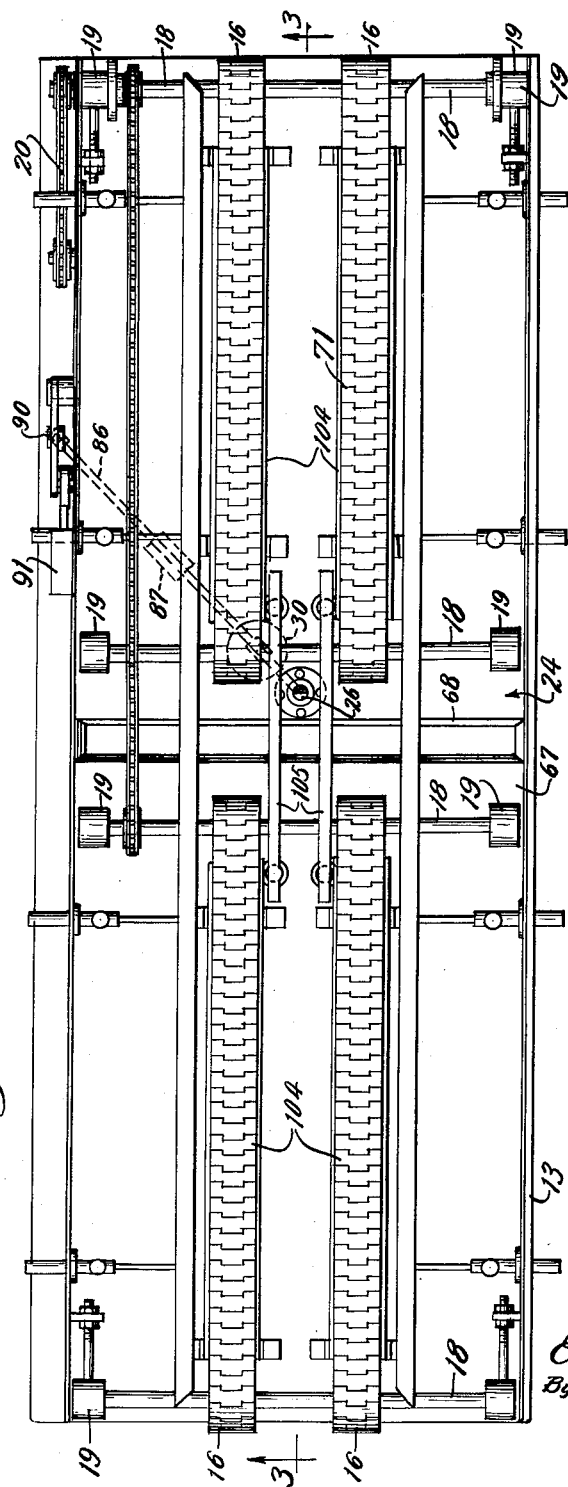

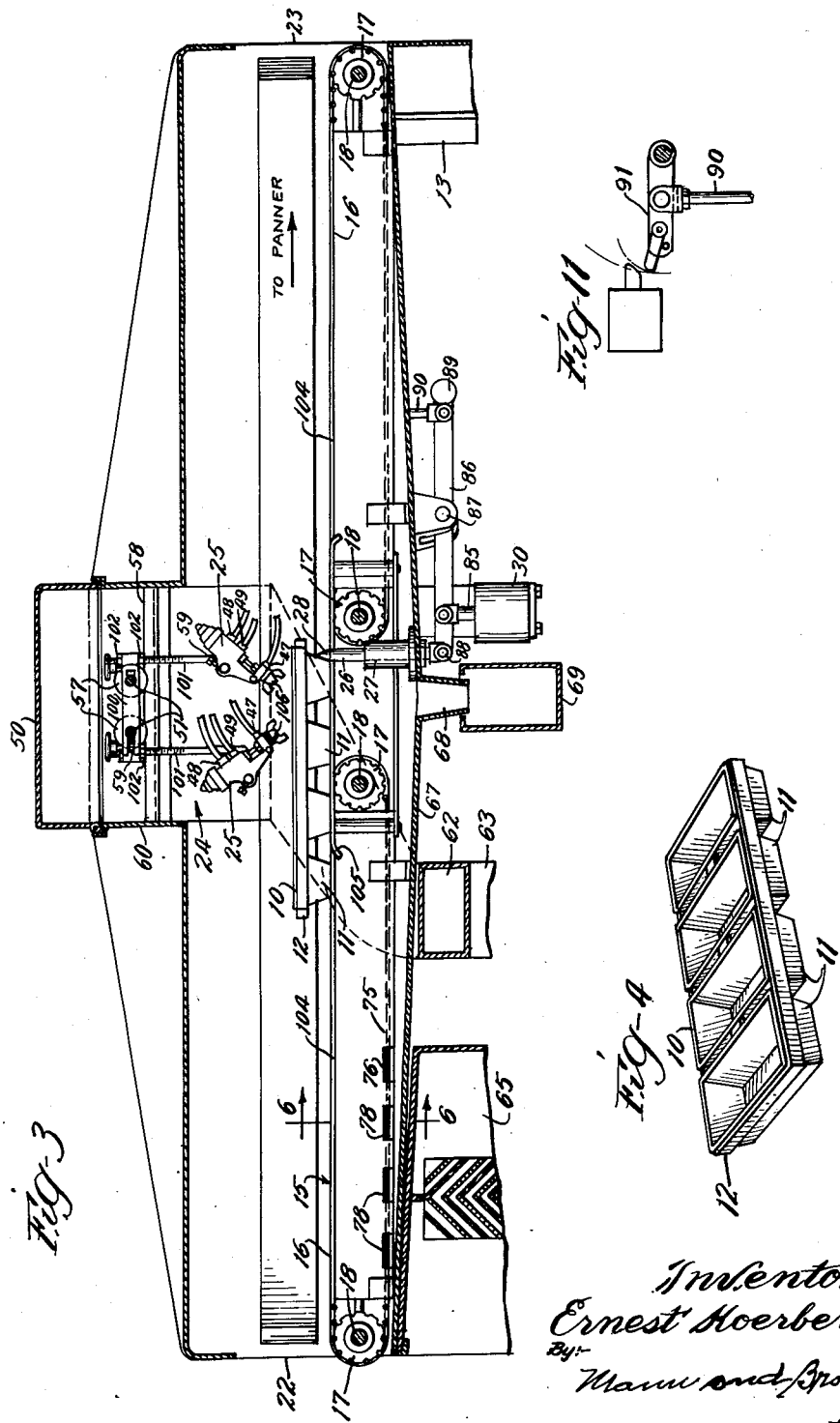

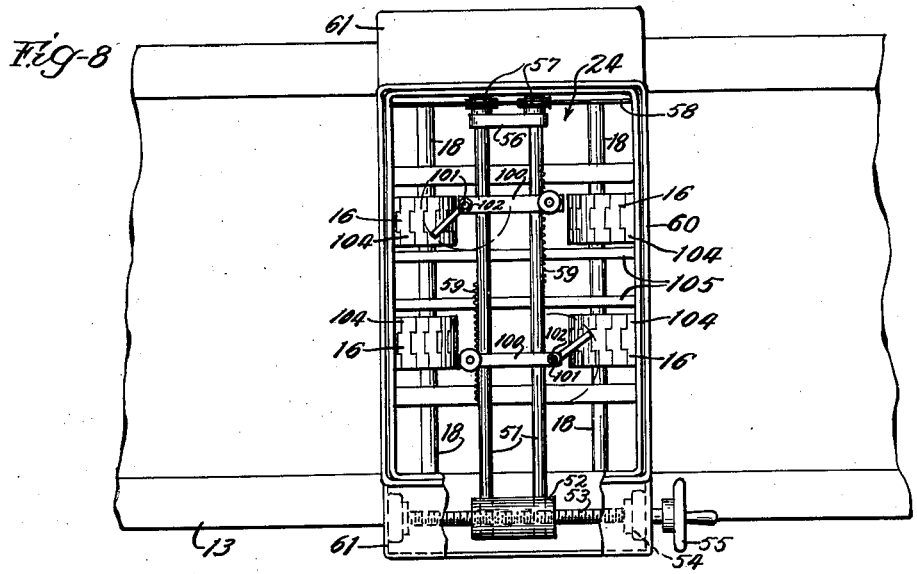
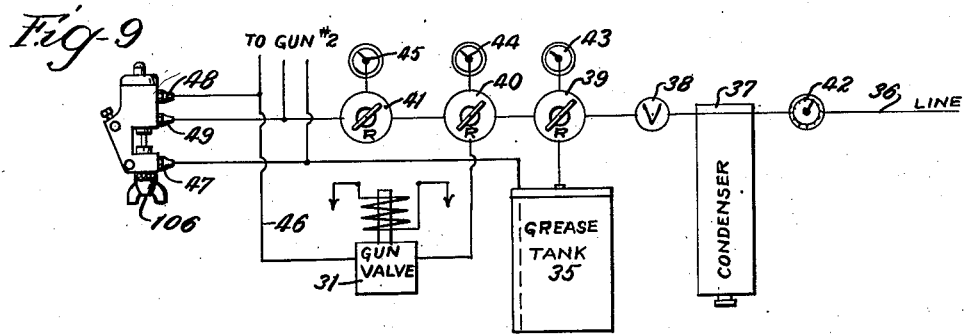
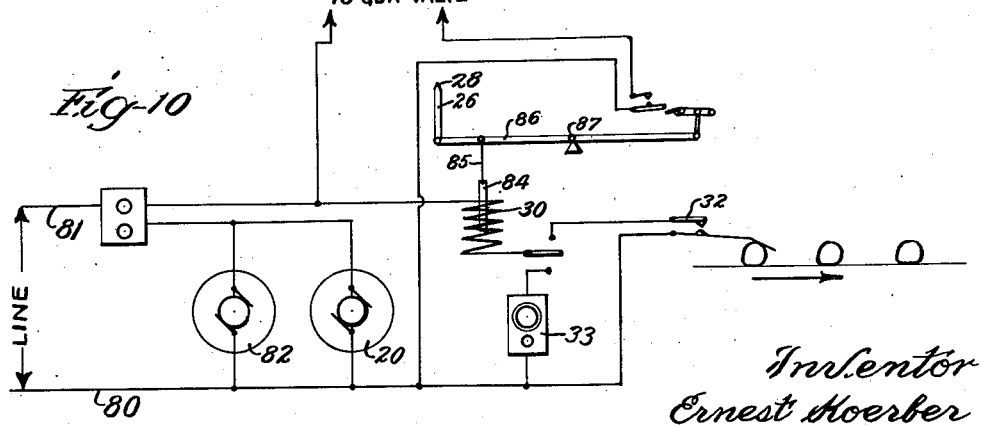

Patented Apr. 7, 1953

2,633,821

UNITED STATES PATENT OFFICE 2,633,821

PAN GREASING APPARATUS

Ernest Koerber, Chicago, Ill.

Application November 4, 1949, Serial No. 125,627

5 Claims. (Cl. 118—11)

This invention relates to bakers' machinery, and has for its principal object to provide an automatic pan greaser for use with a pan return conveying system whereby each pan will reach the panner in condition to receive dough.

Further objects and advantages of the invention will appear as the disclosure proceeds.

In these diagrammatic drawings:

Fig. 1 is a side elevation of a set of apparatus on a portable frame;

Fig. 2 is a plan section taken on the line 2—2 of Fig. 1;

Fig. 3 is a vertical section taken on the line 3—3 of Fig. 2;

Fig. 4 is a perspective view of one form of pan set customarily used and suitable for use with apparatus embodying this invention;

Fig. 5 is an end view looking from the right in Fig. 1;

Fig. 6 is a vertical section on the line 6—6 of Fig. 3;

Fig. 7 is a horizontal section on the line 7—7 of Fig. 6;

Fig. 8 is a plan view of the intermediate portion of the apparatus with the hinged cover of the hood removed;

Fig. 9 is a diagram of the air system for supplying grease;

Fig. 10 is an electrical wiring diagram; and

Fig. 11 is a diagrammatic representation of a trip switch for operating the spray gun valve 31.

This invention is intended for use in bakery equipment including a mixer, a divider, a proofer, a panner, an oven, a cooler, a depanner, etc.

Customarily, such a system is provided with dough and bread containers commonly termed pan sets 10 (Fig. 4), since each includes a plurality of pans 11 secured together by a frame 12 to form a unit or set.

As here shown, the pan greasing apparatus is on a frame generally indicated by 13 and mounted on casters 14 to be portable.

Running lengthwise through the frame is a conveyor generally indicated by 15 including belts or chains 16 running over sprockets 17 on shafts 18 journalled in bearings 19, and one of which is driven from an electric motor 20 and reducing gear 21.

The framework 13 is entirely enclosed by walls except for an entrance 22 at the left in Fig. 3 and an exit 23 at the right convenient to the ends of the conveyor 15. In the use of the apparatus, pan sets 10 travel along the conveyor end to end entering at 22 and leaving at 23.

In the mid-portion of the apparatus, there is what will be called a "greasing station," generally indicated by 24 at or near which are mounted grease guns, such as sprayers or atomizers 25, properly directed toward pans on the conveyor.

Preferably, the pan sets travel by intermittent motion through the apparatus, and as here shown the conveyor is driven continuously while the pans are stopped intermittently and momentarily for each portion of travel corresponding to one of the pans of a set.

In Figs. 3 and 10, there is shown a pan detent or stop 26 represented by a bar adapted to move up and down in a bearing 27 and having a conical or tapered upper end 28 to correspond with the side of one of the pans 11, and adapted to engage it substantially as illustrated in Fig. 3.

By raising the detent at suitable intervals, it can be made to engage a pan on the conveyor at the appropriate time to stop that pan, or another, as here shown, in proper position at the greasing station to receive the charge of grease.

The grease may be applied by the guns 25 as the pan comes to rest in the position shown in Fig. 3, or momentarily as it passes. As here shown, the detent 26 is released or withdrawn by a solenoid 30 (Figs. 3 and 10), which also operates a gun control 31.

The solenoid may be energized in any suitable way, but preferably is energized at selected intervals in timed relation to the work to be done.

As shown in Fig. 10, the solenoid may be energized by a switch 32 associated with the dough panner to the end that as a pan in the system is provided with dough, or moved with dough, another pan in the system is moved forward in the series and is provided with grease.

In Fig. 10, there is also shown a timer 33 for energizing the solenoid at intervals.

The grease supply is stored in a tank 35 (Figs. 1 and 9) associated with an air system including a line 36, a condenser 37, a valve 38, reducing valves 39, 40 and 41 connected with the tank 35, the gun control 31, and the guns 25, as indicated in the diagram Fig. 9, which is deemed sufficient without detailed description.

The system is provided with gauges 42, 43, 44, and 45 to indicate the air pressure in the line 36 on the tank 35, on the guns through the control 31, and on the guns through an auxiliary line 46, there being one inlet for grease 47 to each gun and two inlets for air 48 and 49.

The guns are mounted under a hinged cover 50 of a hood on transverse rods 51 (Fig. 8), one end of which is mounted in a block 52 threaded on a shaft 53, journalled in bearings 54, and equipped with a hand wheel 55. The opposite ends of the shaft 51 are in a block 56 and equipped with rollers 57 on a track 58. By means of this mounting, the guns can be adjusted lengthwise with respect to the greasing station.

The guns are movable laterally on the rods 51, and secured in position by racks and pinions 59, 59 to adjust them laterally with respect to the greasing station.

The guns 25 are suspended from beams or blocks 100 (controlled by racks and pinions 59) by threaded rods 101, which permit the guns to be raised or lowered and turned about vertical axes. They are made fast in selected position by nuts 102.

These things make it possible to arrange the guns in suitable position with respect to variety of sizes of pans and pan sets.

The hood 60 extends crosswise to the enclosure on the frame (Fig. 5) and connects with downturned passages 61 communicating with the transverse conduit 62, which, in turn, communicates with the vertical conduit 63 leading to the intake of a blower 64 that delivers through a separator 65 equipped with a grease pan 66. By this means, all fog of grease about the greasing stations is captured and taken away from the inside of the apparatus, and the grease is separated from the air.

Beneath the conveyor 15 is a grease pan 67 (Fig. 3) inclining toward a delivery spout 68 beneath which there is a collecting tank 69 equipped with a valve 70.

The conveyor belts are preferably made of links 71 of stainless steel or the like, which will not pollute the grease, and means in provided for wiping the conveyor as it passes around the circuit on the return run (refer to Figs. 3, 6, and 7).

At the left in Fig. 3, the return run 75 is shown passing over a series of wipers 76, each of which is composed of inclined bars 77 (Figs. 6 and 7), which will wipe or scrape the grease from the return run of the conveyor and conduct it through the openings 78 in the casing 79 about which the conveyor travels. In this way, the grease is constantly wiped from the conveyor and passed on to the pan 67 to be collected in the tank 69.

In the wiring diagram (Fig. 10), the line is shown at 80 and 81 connected to the blower motor 82 and the conveyor motor 20, and with a solenoid 30.

The armature 84 of the solenoid is connected by linkage 85 with a lever 86 fulcrumed at 87, and having one end pivoted at 88 to the lower end of the detent 26. The other end of the lever 86 is provided with a counter-weight 89 and connected by linkage 90 with a trip switch 91 (Fig. 11) for operating the gun control 31.

From the foregoing, it will be apparent that the invention provides a pan greasing station, a conveyor for pans, a means for giving the pans intermittent motion through the pan greasing station, and greasing means for supplying grease to the pans at appropriate position in the greasing station.

The specific apparatus shown and described to illustrate means for carrying out the operation contemplates a constantly driven conveyor with a detent or an obstruction intercepting the movement of the pans at each interval of travel corresponding to a pan, the detent being operated in timed relation to the operations conducted such as by a timer or dough panner, and serving to fire the grease gun or operate the spray as the pan is in a position best suited to receive the grease.

The tapered point 28 of the detent 26 is about an inch long. As the solenoid 30 moves the detent toward release position, the lever mechanism operates the trip switch 91 (Fig. 11) to work the gun valve 31 electrically. The net result is that just as the detent starts to release a pan set, the guns spray the pan in the greasing position for a period on the order of a quarter of one second, and then cut off until the detent is again retracted to initiate the next pan movement.

The spray guns 25 are preferably provided with discharges or nozzles 106 to spread out the spray or streams of vapor or atomized grease in a way suitable to the area of the pan to be covered. Any excess going beyond the pans is collected by the system and delivered either to the tank 69 or the pan 66.

The unit is entirely enclosed except for the entrance and exit, and is adapted to be kept in sanitary condition at all times.

The disclosure contemplates that the conveyor 15 may be in one piece, running from end to end of the apparatus, but preferably, as shown, it is composed of four units 104 spaced apart laterally, and also spaced in the middle of the machine beneath the greasing station 24, as best shown in Figs. 2 and 3, to leave a gap beneath the greasing station and within the field of fire of the guns, which gap is spanned by rails 105.

With this arrangement, the moving parts of the conveyor are kept out of the field of the guns, and any grease passing downwardly from the pans readily descends into the grease pan 67 to be collected and removed from the system.

The grease wiper shown at the left in Fig. 3 and in detail in Figs. 6 and 7 may be duplicated at the right in Fig. 3.

I claim:

1. In apparatus of the class described, a pan greasing station, a grease sprayer adjacent to the station, a continuously operable pan conveyor passing the station, pan obstructing means for momentarily preventing pans from moving with the conveyor, and means operable independently of the conveyor for releasing the pan obstructing means and operating the grease sprayer.

2. In apparatus of the class described, a pan greasing station, a grease sprayer adjacent to the station, a continuously operable pan conveyor passing the station, pan obstructing means for preventing pans from moving with the conveyor during movement of the conveyor, and timing means operatively connected to said sprayer and said obstructing means for intermittently releasing the pan obstructing means and operating the grease sprayer while such pans are stopped by said obstructing means.

3. In apparatus of the class described, a pan greasing station, a grease sprayer adjacent to the station, a continuously operable pan conveyor passing the station, pan obstructing means for momentarily preventing pans from moving with the conveyor, and means operable independently of the conveyor for simultaneously releasing the pan obstructing means and operating the grease sprayer.

4. In apparatus of the class described, a pan greasing station, a pan greaser at the station, a conveyor moving continuously past the greasing station, a detent normally positioned for momentarily restraining pans on the conveyor, electrically-actuated means connected to retract the detent and simultaneously operate the pan greaser, and switch means operable independently of the conveyor for controlling the electrically-actuated means.

5. In apparatus of the character described, a pan greasing station, a continuously operable pan conveyor passing said station, a grease sprayer adjacent to the station, a detent movable between actuated position, wherein said detent is disposed in position to engage and restrain pans on said conveyor, and retracted position, electrically actuated means connected to move said detent between said actuated and said retracted positions and to simultaneously operate said sprayer while said detent is disposed in said actuated position, and switch means operable independently of the movement of said conveyor for controlling said electrically-actuated means.

ERNEST KOERBER.

REFERENCES CITED

The following references are of record in the file of this patent:

UNITED STATES PATENTS

| Number | Name | Date |
| --- | --- | --- |
| 1,753,393 | Van Houten | Apr. 8, 1930 |
| 1,781,546 | Harber | Nov. 11, 1930 |
| 2,350,708 | Roselund | June 6, 1944 |
| 2,421,343 | Mageoch | May 27, 1947 |
| 2,499,621 | Archer | Mar. 7, 1950 |